United States Patent
Kim et al.

(10) Patent No.: US 7,345,730 B2
(45) Date of Patent: Mar. 18, 2008

(54) LIQUID CRYSTAL DISPLAY AND THIN FILM TRANSISTOR ARRAY PANEL THEREFOR COMPRISING BENT DATA LINES

(75) Inventors: Hee-Seop Kim, Gyeonggi-do (KR); Doo-Hwan You, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 277 days.

(21) Appl. No.: 10/942,050

(22) Filed: Sep. 16, 2004

(65) Prior Publication Data

US 2005/0094082 A1    May 5, 2005

(30) Foreign Application Priority Data

Sep. 19, 2003   (KR) .................. 10-2003-0065216

(51) Int. Cl.
*G02F 1/1343* (2006.01)
(52) U.S. Cl. .................. 349/145; 349/146; 349/143
(58) Field of Classification Search ......... 349/144–146
See application file for complete search history.

(56) References Cited

U.S. PATENT DOCUMENTS

| | | | |
|---|---|---|---|
| 5,745,207 A * | 4/1998 | Asada et al. ................ 349/141 |
| 5,946,066 A * | 8/1999 | Lee et al. .................... 349/141 |
| 6,407,791 B1 * | 6/2002 | Suzuki et al. ............... 349/129 |
| 6,512,564 B1 * | 1/2003 | Yoshida et al. ............. 349/124 |
| 6,680,771 B2 * | 1/2004 | Yu et al. ..................... 349/139 |
| 6,724,452 B1 * | 4/2004 | Takeda et al. .............. 349/139 |
| 2002/0118331 A1 * | 8/2002 | Sakamoto et al. .......... 349/141 |

* cited by examiner

*Primary Examiner*—David Nelms
*Assistant Examiner*—W. Patty Chen
(74) *Attorney, Agent, or Firm*—Cantor Colburn LLP

(57) ABSTRACT

A liquid crystal display (LCD) with a direction control electrode and a pixel electrode forming a capacitance in a pixel regions is disclosed. Gate lines are formed on the first substrate and extending in the first direction. Data lines are intersecting the gate lines and each data line has a bent shape. Pixel regions are defined by the intersecting of the gate lines and the data lines. The direction control electrode is formed at the corresponding pixel region and electrically connected to the corresponding data line. The pixel electrode is formed at the corresponding pixel region and has a shape conformal to the corresponding pixel region. By adjusting the capacitance between the direction control electrode and the pixel electrode, liquid crystal stability is enhanced.

42 Claims, 8 Drawing Sheets

LIQUID CRYSTAL DISPLAY AND THIN FILM TRANSISTOR ARRAY PANEL THEREFOR COMPRISING BENT DATA LINES

BACKGROUND OF THE INVENTION

1. Field of the Invention

The present invention relates to a liquid crystal display and a thin film transistor array panel.

2. Description of the Related Art

A liquid crystal display (LCD) is one of the most widely used flat panel displays. An LCD includes two panels provided with field-generating electrodes and liquid crystal interposed therebetween. The LCD displays images by applying voltages to the field-generating electrodes to generate an electric field in liquid crystal, which determines orientations of liquid crystal molecules to adjust polarization of incident light.

The LCD has a disadvantage of a narrow viewing angle. Various techniques for improving the viewing angle have been suggested. Among them, it has been found promising to utilize vertically aligned liquid crystal and to form cutouts or protrusions at the field-generating electrodes such as pixel electrodes and a common electrode.

Since the cutouts and the protrusions reduce the aperture ratio, it is suggested that the size of the pixel electrodes should be maximized. However, the proximity between the pixel electrodes causes strong lateral electric fields, which dishevels orientations of the liquid crystal molecules to yield textures and light leakage, thereby deteriorating display characteristics.

SUMMARY OF THE INVENTION

An aspect of the disclose invention is a liquid crystal display (LCD) having a first substrate. Gate lines are formed on the first substrate and extending in the first direction. Data lines are intersecting the gate lines and each data line has a bent shape. Pixel regions are defined by the intersecting of the gate lines and the data lines. Direction control electrodes are formed at the corresponding pixel regions and electrically connected to the corresponding data lines. Pixel electrodes are formed at the corresponding pixel regions and have a shape conformal to the corresponding pixel regions. The pixel electrodes are electrically disconnected from the data lines. A passivation layer is formed between the direction control electrode and the pixel electrode.

The pixel region of the LCD satisfies the following equation:

$$Vdce > Vp(1+\epsilon d'/\epsilon' d),$$

where Vdce is a voltage of the direction control electrode, Vp is a voltage of the pixel electrode, $\epsilon$ is a dielectric constant of the liquid crystal, d is a distance between the pixel electrode and the common electrode, $\epsilon'$ is a dielectric constant of the passivation layer, and d' is a distance between the pixel electrode and the direction control electrode.

BRIEF DESCRIPTION OF THE DRAWINGS

The above and other advantages of the present invention will become more apparent by describing preferred embodiments thereof in detail with reference to the accompanying drawings, in which.

DETAILED DESCRIPTION OF THE PREFERRED EMBODIMENTS

Figure 1:
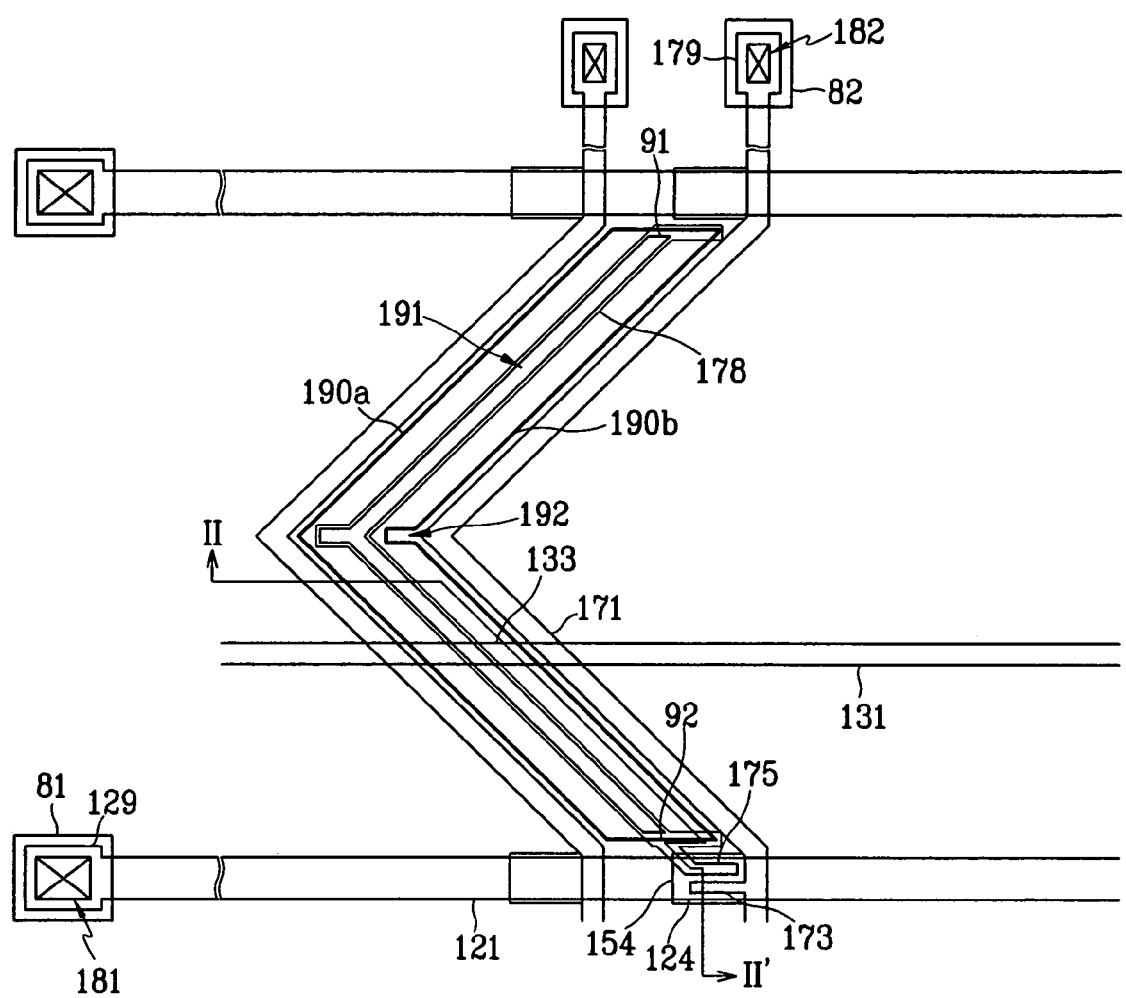
FIG. 1 is a layout view of an LCD according to the first embodiment of the present invention.

The present invention will now be described more fully hereinafter with reference to the accompanying drawings, in which preferred embodiments of the invention are shown. The present invention may, however, be embodied in many different forms and should not be construed as limited to the embodiments set forth herein.

In the drawings, the thickness of layers, films and regions are exaggerated for clarity. Like numerals refer to like elements throughout. It will be understood that when an element such as a layer, film, region, or substrate is referred to as being "on" another element, it can be directly on the other element or intervening elements may also be present. In contrast, when an element is referred to as being "directly on" another element, there are no intervening elements present.

First Embodiment

Figure 2:
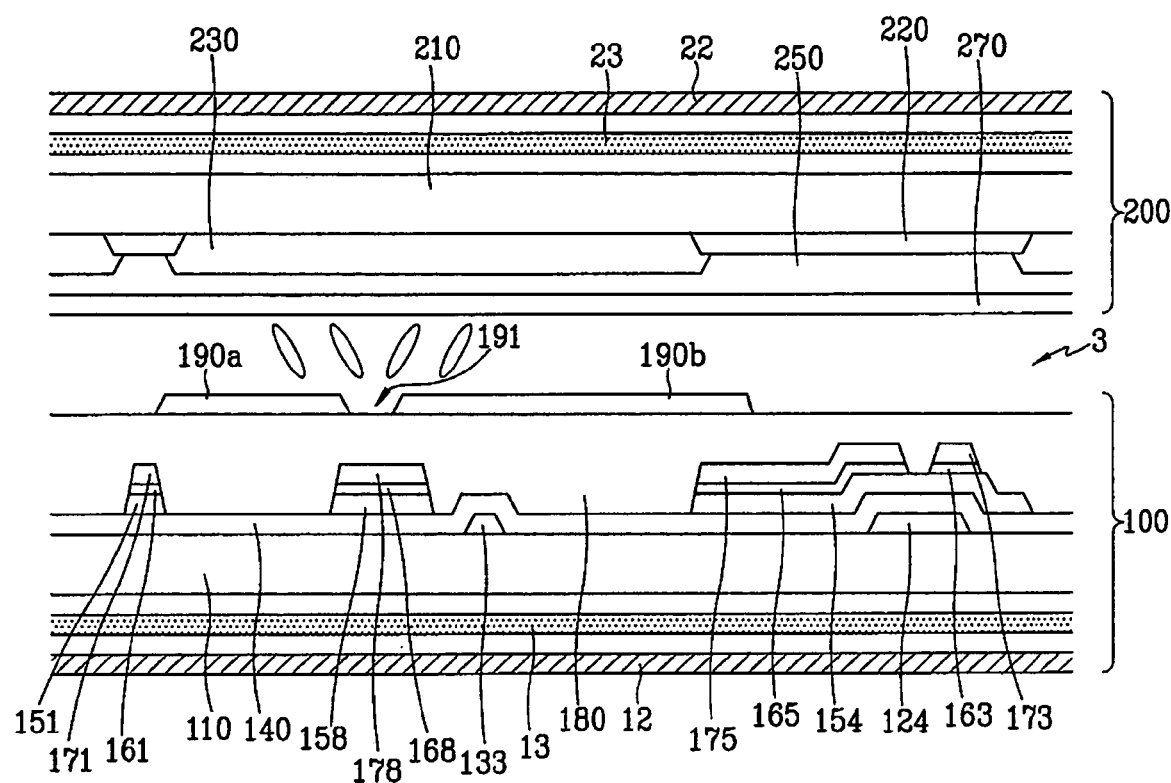
FIG. 2 is a sectional view of the LCD of FIG. 1, taken along the line II-II'.
Figure 3:
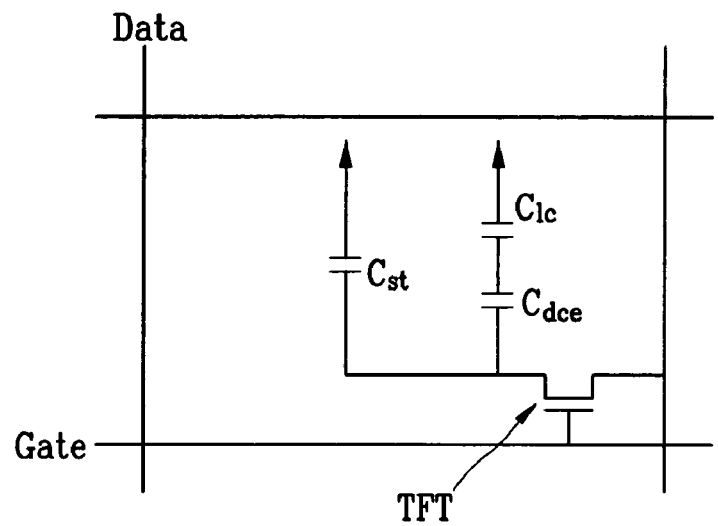
FIG. 3 is a circuit diagram of the LCD of FIGS. 1 and 2.
Figure 4:
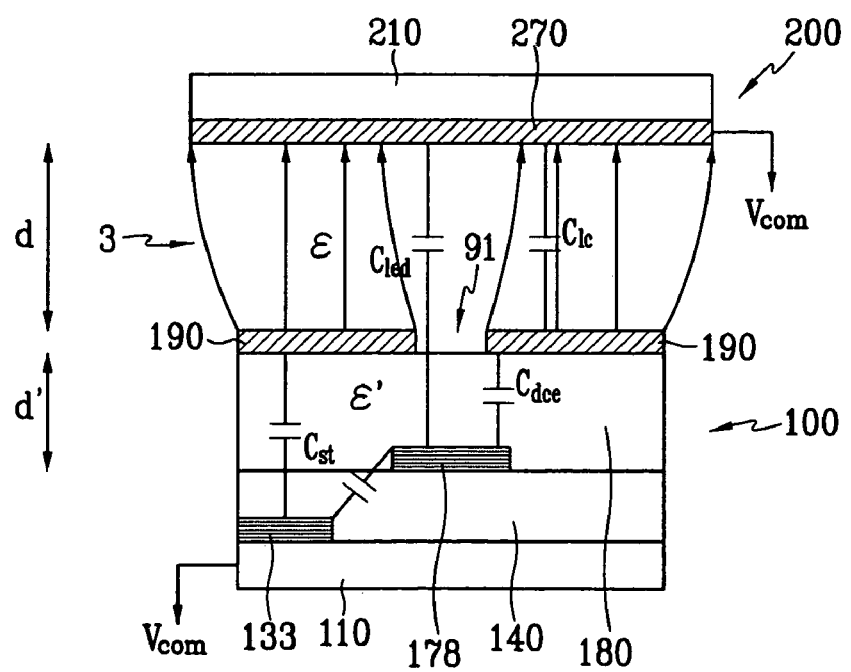
FIG. 4 is a conceptual diagram of the LCD of FIGS. 1 and 2.

FIG. 1 depicts a layout view of an LCD according to the first embodiment of the present invention. FIG. 2 depicts a sectional view of the LCD shown in FIG. 1 taken along the line II-II'. FIG. 3 depicts a circuit diagram of the LCD shown in FIGS. 1 and 2. FIG. 4 illustrates a conceptual diagram of the LCD shown in FIGS. 1 and 2. As shown in FIG. 2, the LCD includes a TFT array panel 100, a common electrode panel 200, and a liquid crystal layer 3 interposed between the panels 100 and 200 and containing liquid crystal molecules aligned vertically with respect to the panels 100 and 200.

A plurality of gate lines 121 and a plurality of storage electrode lines 131 are formed on an insulating substrate 110. The gate lines 121 extend substantially in a transverse direction and are separated from each other and transmit gate signals. The gate lines 121 have a plurality of gate electrodes 124 and expansions 129 for connecting to external circuits. Each storage electrode line 131 extends substantially in the transverse direction and includes a plurality of storage electrodes 133. The storage electrode lines 131 are supplied with a predetermined voltage such as a common voltage, which is applied to a common electrode 270 on the common electrode panel 200.

The gate lines 121 and the storage electrode lines 131 may have a multi-layered structure, for example, two layers with different physical characteristics (i.e., a lower film and an upper film). The lower film is preferably formed of metal with a low resistivity, (e.g., Al or an Al alloy) for reducing signal delay or voltage drop. The upper film is preferably made of a conductive material (e.g., Cr, Mo, or an Mo alloy) which exhibits good contact characteristics with other conductive materials (e.g., as indium tin oxide (ITO) or indium zinc oxide (IZO)). Preferably, the lower and upper layers are formed of Cr and an Al—Nd alloy, respectively. The lateral sides of the gate lines 121 and the storage electrode lines 131 are tapered, and the inclination angle of the lateral sides with respect to the substrate 110 ranges between about 30° to about 80°. A gate insulating layer 140, preferably formed of silicon nitride (SiNx), is formed on the gate lines 121 and the storage electrode lines 131.

A semiconductor layer, preferably formed of hydrogenated amorphous silicon (abbreviated to "a-Si"), is formed on the gate insulating layer 140. The semiconductor layer includes a stripes 151, a projections 154 and an extensions 158. The stripe 151 includes a plurality of pairs of oblique portions and a plurality of longitudinal portions. Two oblique portions constituting a pair are connected to each other at their one ends to form a chevron, and the other ends of the pair are connected to respective longitudinal portions. The oblique portions of the stripe 151 form an angle of about 45 degrees with respect to the gate lines 121. The longitudinal portions cross over the gate electrodes 124. The length of a pair of oblique portions is about one to nine times the length of the longitudinal portion and occupies about 50 to 90 percent of the total length of the pair of oblique portions and the longitudinal portion. The extension 158 includes a chevron portion extended from the projection 154 and parallel to the pair of oblique portions of the stripe 151.

An ohmic contact layer, preferably formed of silicide or n+ hydrogenated a-Si heavily doped with n-type impurities, is formed on the semiconductor layer. The ohmic contact layer includes a stripe 161, islands 165 and 168, and a projection 163. The stripe 161 is formed on the stripe 151, and the island 168 is formed on the extension 158. The island 165 and the projection 163 are formed on the projection 154.

On the ohmic contact layer, a data wiring layer is formed. The data wiring layer comprises data lines 171, a source electrode 173, a drain electrode 175, and a direction control electrodes 178. The data line 171 is formed on the stripe 161 and the direction control window 178 is formed on the island 168. The source and drain electrode 173 and 175 are formed on the projection 163 and the island 165, respectively.

The data lines 171 for transmitting data voltages intersect the gate lines 121 and the storage electrode lines 131. Each data line 171 includes a plurality of pairs of oblique portions and a plurality of longitudinal portions. Two oblique portions constituting a pair are connected to each other at their one ends to form a chevron, and the other ends of the pair are connected to respective longitudinal portions. The oblique portions of the data lines 171 form an angle ranged between about 30° and about 60°, preferably 45°, with respect to the gate lines 121, and the longitudinal portions cross over the gate electrodes 124. The length of a pair of oblique portions is about one to nine times the length of a longitudinal portion, and occupies about 50-90 percent of the total length of the pair of oblique portions and the longitudinal portion. Thus, pixel areas defined by crossing of the gate lines 121 and the data lines 171 have the shape of a bent stripe.

Each data line 171 includes a data pad 179 wider than the data line 171 for contact with another layer or an external device. A branch from the data line 171, which projects toward the drain electrodes 175, form the source electrode 173. The source electrode 173 and the drain electrode 175 are separated from each other and opposite each other with respect to a gate electrode 124. A gate electrode 124, a source electrode 173, and a drain electrode 175 along with a projection 154 form a thin film transistor (TFT) having a channel formed in the projection 154 disposed between the source electrode 173 and the drain electrode 175.

The direction control electrode 178 is extended parallel to the pair of oblique portions of the data line 171. A first portion of the direction control electrode 178 forms an angle ranged between about 120° and about 150°, preferably 135°, with the gate line 121. The second portion of the direction control electrode 178 forms an angle ranged between 30° to 60°, preferably 45°, with the gate line 121. The direction control electrode 178 overlaps with a cutout 191 of the pixel electrode 190. The direction control electrode 178 is wider than the cutout 191. The direction control electrode 178 and the pixel electrode forms a capacitance.

The data lines 171, the source electrode 173, the drain electrode 175 and the direction control electrodes 178 may have a multi-layered structure, for example, two layers (i.e., a lower film and an upper film) having different physical characteristics. The lower layer is preferably formed of metal with a low resistivity (e.g., Al or an Al alloy) for reducing signal delay or voltage drop in the data lines. The upper layer is preferably formed of a material (e.g., Cr, Mo, or an Mo alloy) with good contact characteristics with other conductive materials (e.g., indium tin oxide (ITO) and indium zinc oxide (IZO)). For example, the upper and lower layers are formed of Cr and an Al—Nd alloy, respectively. The lateral sides of the data lines 171, the drain electrodes 175 and the direction control electrodes 178 are tapered, and the inclination angle of the lateral sides with respect to the substrate 110 ranges between about 30° and about 80°.

A passivation layer 180 is formed on the data wiring layer. The passivation layer 180 is preferably formed of a flat photosensitive organic material or a low dielectric insulating material having a dielectric constant under 4.0, as a-Si:C:O and a-Si:O:F formed by plasma enhanced chemical vapor deposition (PECVD) or an inorganic material such as silicon nitride or silicon oxide.

The passivation layer 180 has a plurality of contact holes 182 exposing the pad 179 of the data lines 171. The passivation layer 180 and the gate insulating layer 140 have a plurality of contact holes 181 exposing the gate pads 129. The sidewalls of the contact holes 181 and 182 form an angle ranged between about 30° and about 85° with respect to the substrate 110 and are stepped. The contact holes 181 and 182 may have various planar shapes, such as a rectangular shape and a circular shape. The size of each contact hole 181, 182, and 183 is preferably equal to or greater than 0.5 mm×15 μm but no greater than 2 mm×60 μm.

The pixel electrodes 190a and 190b and contact assistants 81 and 82, preferably formed of ITO, IZO, or Cr, are formed on the passivation layer 180. The pixel electrodes 190a and 190b have a shape conformal to the pixel area. The pixel electrode is divided into the first pixel electrode 190a and the second pixel electrode 190b by the chevron cutout 191. The first pixel electrode 190a and the second pixel electrode 190b have substantially the same shape. The first pixel electrode 190a and the second pixel electrode 190b are coupled by connectors 91 and 92. The first pixel electrode 190a and the second pixel electrode 190b have a cutout 192 which divides each of them into a lower portion and an upper portion.

The pixel electrode 190a and 190b are not electrically connected to the drain electrodes 175. The pixel electrode 190a and 190b form a capacitance with the direction control electrode 178 connected to the drain electrode 175. Therefore, the voltage of the pixel electrode 190a and 190b is varied by the voltage of the direction control electrodes 178. The voltage of the direction control electrodes 178 is always higher than that of the pixel electrodes 190a and 190b. More detailed relationship the pixel electrodes 190a and 190b and the direction control electrodes 178 will be described later with reference to FIGS. 4 and 5.

In FIGS. 2 to 5, the common electrode panel 200 has a black matrix 220 formed on an insulating substrate 210. A plurality of red, green, and blue color filters 230 are formed on the black matrix and the substrate 210 in the shape similar the corresponding pixel regions. An overcoat 250 is formed on the color filters 230 and the black matrix 220. A common electrode 270, preferably form of a transparent conductive material (e.g., ITO or IZO), is formed on the overcoat 250. The liquid crystal layer 3 is disposed in a gap between the panels 100 and 200. The liquid crystal molecules in the liquid crystal layer 3 are aligned such that their long axes are vertical to the surfaces of the panels 100 and 200 when there is no electric field. The liquid crystal layer 3 has negative dielectric anisotropy.

The thin film transistor array panel 100 and the color filter array panel 200 are assembled to precisely align the pixel electrodes 190a and 190b with the corresponding color filter 230. When the two panels 100 and 200 are assembled, pixel areas are divided into a plurality of sub-areas along the edges of the pixel electrodes 190a and 190b and the cutouts 191 and 192, thereby forming 4 domains in a single pixel region. Each domain has two longest edges parallel to each other. The length of the two longest edges of the domain ranged between about 10 and about 30 Å. A pair of polarizers 12 and 22 is provided on the outer surfaces of the panels 100 and 200 such that their transmissive axes are crossed and one of the transmissive axes is parallel to the gate lines 121. The LCD may further include at least one retardation film (e.g., an optical element that produces, for example, full, half, or quarter wave phase changes of polarized light) for compensating the retardation of the liquid crystal layer 3.

When a common voltage is applied to the common electrode 270 and a data voltage is applied to the pixel electrodes 191a and 191b, a primary electric field substantially perpendicular to the panels 100 and 200 is generated. The liquid crystal molecules tend to change their orientations in response to the electric field such that their long axes are perpendicular to the field direction.

The cutout 191 and the edges of the pixel electrodes 190a and 190b distort the primary electric field to have a horizontal component which determines the tilt directions of the liquid crystal molecules. The horizontal component of the primary electric field adopts four different orientations, thereby forming four domains in the liquid crystal layer 3 with different liquid crystal molecule tilt directions. The horizontal component is perpendicular to the first and second edges of the cutout 191, and perpendicular to the edge of the pixel electrode 190a and 190b. Accordingly, four domains having different tilt directions are formed in the liquid crystal layer 300.

The directions of a secondary electric field due to the voltage difference between the pixel electrodes 190a and 190b are perpendicular to each of the edge of the cutout 191. Accordingly, the field direction of the secondary electric field coincides with that of the horizontal component of the primary electric field. Consequently, the secondary electric field between the pixel electrodes 190a and 190b enhances the tilt directions of the LC molecules.

Since the LCD performs inversion (i.e., inverting the polarity of an applied voltage) such as dot inversion, column inversion, etc., a secondary electric field that enhances the tilt directions of the liquid crystal molecules is attained by supplying an adjacent pixel electrode with a data voltage having an opposite polarity with respect to the common voltage. As a result, a direction of the secondary electric field generated between adjacent pixel electrodes is equivalent to the horizontal component of the primary electric field generated between the common and pixel electrodes. Thus, a secondary electric field between the adjacent pixel electrodes can be generated to enhance the stability of the domains.

The tilt directions of all the domains form an angle of about 45 degrees with the gate lines 121, and the gate lines 121 are parallel or perpendicular to the edges of the panels 100 and 200. Since 45° intersection of the tilt directions and transmissive axes of the polarizers results in maximum transmittance, the polarizers can be attached such that the transmissive axes of the polarizers are parallel or perpendicular to the edges of the panels 100 and 200, thereby reducing the production cost.

It should be noted that increased resistance of the data lines 171 due to their bent structure can be compensated for by widening the data lines 171. Further, distortion of the electric field and an increase of the parasitic capacitance due to the increased width of the data lines 171 can, in turn, be compensated by increasing the size of the pixel electrodes 190a and 190b and by adapting a thick organic passivation layer.

The voltages of the pixel electrodes 190a and 190b depend on the voltage of the direction control electrodes 178, since the pixel electrodes 190a and 190b and the direction control electrode 178 form a capacitance. The voltages of the pixel electrodes 190a and 190b are always smaller than that of the direction control electrodes 178. In other words, the voltage of the direction control electrodes 178 is bigger than that of the pixel electrodes 190a and 190b. Therefore, the voltage of the direction control electrodes 178 affects the liquid crystal layer 3 to enhance stability of the liquid crystal.

Now, the reason that the voltage of the direction control electrodes 178 is always bigger than that of the pixel electrodes 190a and 190b will be described with reference to FIGS. 3 and 4. As shown in FIGS. 3 and 4, the direction control electrode 178 and the pixel electrodes 190a and 190b form a capacitance Cdce. The pixel electrodes 190a and 190b and the common electrode 270 form a capacitance Clc. The pixel electrodes 190a and 190b and the storage electrode 133 form a storage capacitance Cst. The direction control electrode 178 and the common electrode 270 form a capacitance Clcd. The direction control electrode 178 and the storage electrode 133 form a capacitance Cstd.

As shown in FIG. 4, when a data voltage Vdce is applied to the direction control electrode 178, the pixel electrodes 190a and 190b have a voltage Vp smaller than Vdce due to a voltage distribution between Cdce and Clc. That is, $$Vp = Vdce * Cdce/(Cdce+Clc) \quad (1)$$

Since Cdce/(Cdce+Clc) is always smaller than 1, Vp is smaller than Vdce. When ε represents a dielectric constant of the liquid crystal layer 3, d represents a distance between the pixel electrode 190a and 190b and the common electrode 270, ε' represents a dielectric constant of the passivation layer 180, and d' represents a distance between the pixel electrode 190a and 190b and the direction control electrode 178, the following formula will be satisfied such that the direction control electrode 178 plays a role of enhancing stability of the liquid crystal array.

$$Vdce > Vp(1+\epsilon d'/\epsilon' d) \qquad (2)$$

According to the Formula (1), since Vp can be adjusted by Cdce, the formula (2) can be satisfied by adjusting Cdce. Cdce can be adjusted by varying an overlapping area or a distance between the direction control electrode 178 and the pixel electrodes 190a and 190b. The overlapping area may be easily varied by adjusting the width of the direction control electrode 178, and the distance may be varied by changing location of the direction control electrode 178. For example, the direction control electrode 178 is formed on the same layer as the data line 171, or the direction control electrode 178 may also be formed on the same layer as the gate line 121 to increase the distance between the direction control electrode 178 and the pixel electrodes 190a and 190b.

Second Embodiment

Figure 5:
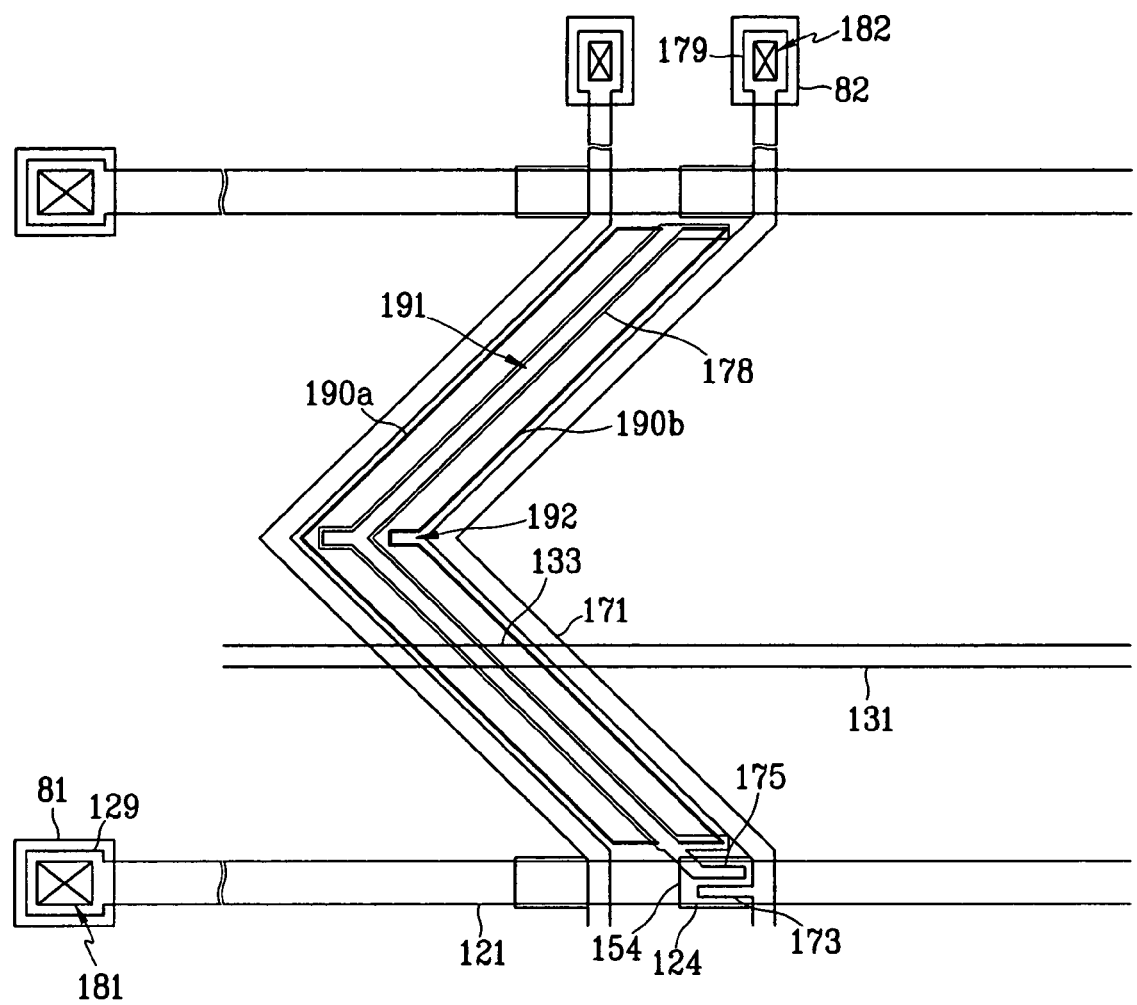
FIG. 5 is a layout view of an LCD according to the second embodiment of the present invention.

Arrangement of the direction control electrode 178 may be formed in a various way. FIG. 5 is a layout view of an LCD according to the second embodiment of the present invention. In comparing the first embodiment and the second embodiment, the difference is complete separation of the first pixel electrode 190a and the second pixel electrode 190b by the cutout 191. The first pixel electrode 190a is separated by a predetermined distance from the second pixel electrode 190b. The direction control electrode 178 is overlapped and form a capacitance with the first pixel electrode 190a and the second pixel electrode 190b, respectively.

The first pixel electrode 190a and the second pixel electrode 190b have substantially the same shape, divide a pixel area into a right area and a left area, and respectively occupy the right area and the left area. Therefore, the first pixel electrode 190a would correspond to the second pixel electrode 190b by a parallel movement along the gate lines 121.

At this time, coupling capacitances between the direction control electrode 178 and the first and second pixel electrodes 190a and 190b will be adjusted to assume that the voltages of the first and second pixel electrodes 190a and 190b are smaller than the voltage of the direction control electrode 178 by an amount of at least Vp(εd'/ε'd). It is preferable that the voltage of the first pixel electrode 190a is different from that of the second pixel electrode 190b by a predetermined value. The voltage difference between the first and second pixel electrodes 190a and 190b may be achieved by differentiating the size of an overlap area between the direction control electrode 178 and the first pixel electrode 190a from the size of an overlap area between the direction control electrode 178 and the second pixel electrode 190b. In the meantime, when a pixel area includes two sub-areas with different electric fields, lateral visibility is improved by the mutual compensation in the two sub-areas.

Third Embodiment

Figure 6:
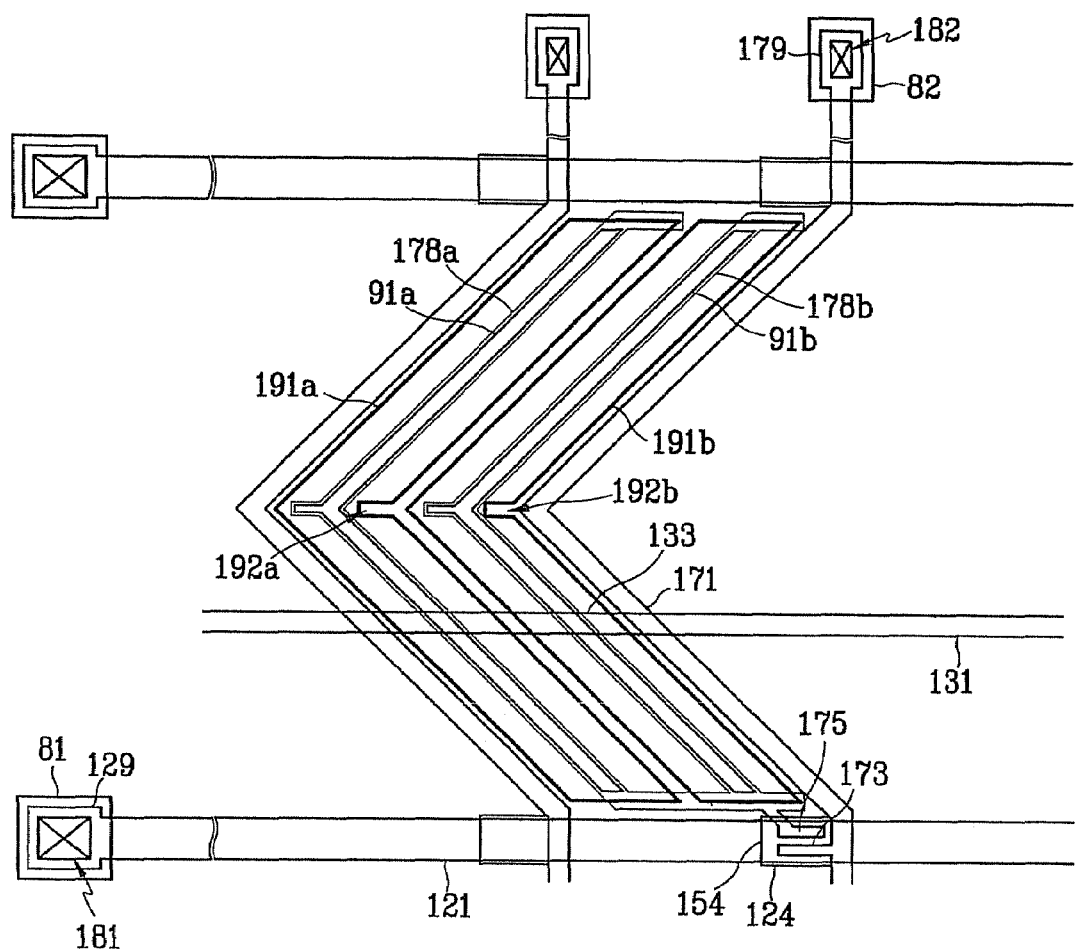
FIG. 6 is a layout view of an LCD according to the third embodiment of the present invention.
Figure 7:
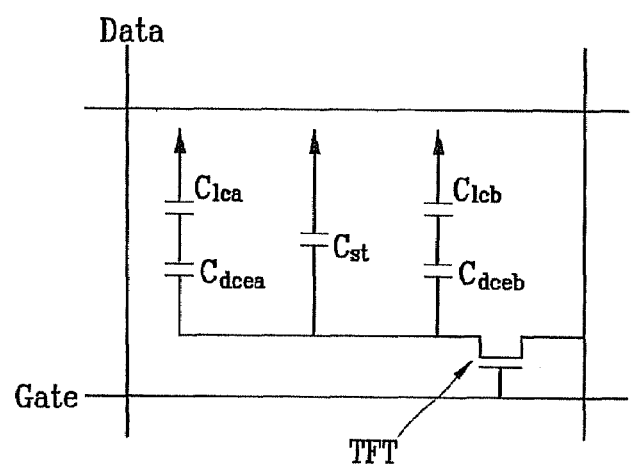
FIG. 7 is a circuit diagram of the LCD of FIG. 6.

FIG. 6 is a layout view of an LCD according to the third embodiment of the present invention, and FIG. 7 is a circuit diagram of the LCD shown in FIG. 6. As shown in FIG. 6, a first pixel electrode 190a and a second pixel electrode 190b are formed in a pixel area and are electrically floated. The first pixel electrode 190a is separated by a predetermined distance from the second pixel electrode 190b.

The first pixel electrode 190a and the second pixel electrode 190b have substantially the same shape, divide a pixel area into a right area and a left area, and respectively occupy the right area and the left area. Therefore, the first pixel electrode 190a would correspond to the second pixel electrode 190b by a parallel movement along the gate lines 121. The first pixel electrode 190a and the second pixel electrode 190b respectively have chevron shaped cutouts 191a and 191b, and are divided into right and left portions by the cutouts 191a and 191b. The first and second pixel electrodes 190a and 190b respectively have cutout 192a and 192b, dividing them into lower portions and upper portions.

A first direction control electrode 178a and a second direction control electrode 178b are formed in a pixel area. The first direction control electrode 178a overlaps the first cutout 191a of the first pixel electrode 190a. The second direction control electrode 178b overlaps the second cutout 191b of the second pixel electrode 190b. The first and second direction control electrodes 178a and 178b are connected to the drain electrode 175.

The voltage of the first pixel electrode 190a is adjusted to be smaller than the voltage of the first direction control electrode 178a by a value of at least Vpa(εd'/ε'd). The voltage of the second pixel electrode 190b is adjusted to be smaller than the voltage of the lo second direction control electrode 178b by a value of at least Vpb(εd'/ε'd). Here, Vpa represents the voltage of the first pixel electrode 190a, and Vpb represents the voltage of the second pixel electrode 190b. ε represents a dielectric constant of the liquid crystal layer 3, d represents a distance between the pixel electrode 190a and 190b and the common electrode 270, ε' represents a dielectric constant of the passivation layer 180, and d' represents a distance between the pixel electrodes 190a and 190b and the direction control electrodes 178a and 178b.

It is preferable that the voltage of the first pixel electrode 190a is different from that of the second pixel electrode 190b by a predetermined value. The voltage difference between the first and second pixel electrodes 190a and 190b may be achieved by differentiating the size of an overlap area between the first direction control electrode 178a the first pixel electrode 190a from the size an overlap area between the second direction control electrode 178b and the second pixel electrode 190b. As described above, when a pixel area includes two sub-areas with different electric fields, lateral visibility is improved by the mutual compensation in the two sub-areas.

According to the voltage distribution law, the voltage Vpa of the first pixel electrode 190a and the voltage Vpb of the second pixel electrode 190b can be described as follows:

$$Vpa = Vdcea * Cdcea/(Cdcea + Clca) \qquad (3)$$

$$Vpb = Vdceb * Cdceb/(Cdceb + Clcb) \qquad (4)$$

According to the formulas (3) and (4), the voltages of the first and second direction control electrodes 178a and 178b can be controlled by adjusting Cdcea and Cdceb. Cdcea represents the capacitance formed between the first pixel electrode 178a and the first pixel electrode 190a, and Cdceb represents the capacitance formed between the second pixel electrode 178b and the second pixel electrode 190b. Clca representing the capacitance between the first pixel electrode 190a and the common electrode 270 and Clcb representing the capacitance between the second pixel electrode 190b and the common electrode 270 may be adjusted to control Vpa and Vpb by adjusting an overlapping area between the first and second pixel electrodes 190a and 190b and the common electrode 270. It is preferable for enhancing transmittance of light that Vpa and Vpb approach Vd.

Fourth Embodiment

Figure 8:
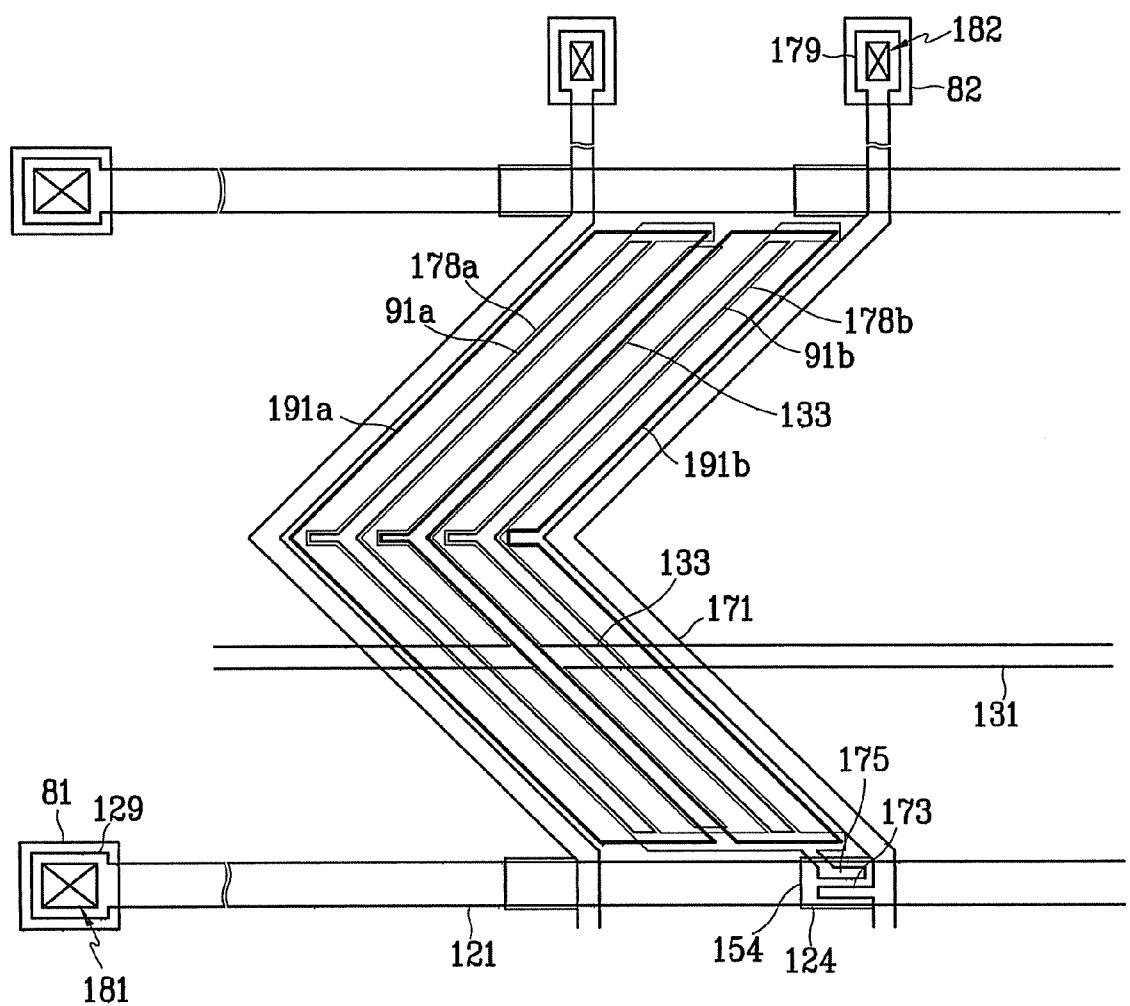
FIG. 8 is a layout view of an LCD according to the fourth embodiment of the present invention.

FIG. 8 is a layout view of an LCD according to the fourth embodiment of the present invention. In comparison to the third embodiment, the fourth embodiment further includes a plurality of storage electrodes 133 formed between the first pixel electrode 190a and the second pixel electrode 190b. The storage electrode 133 is formed between the first pixel electrode 190a and the second pixel electrode 190b to enhance a fringe field around the boundary of the first and second pixel electrodes 190a and 190b. Enhancement of the fringe field results in enhancing the stability of the domains.

Fifth Embodiment

Figure 9:
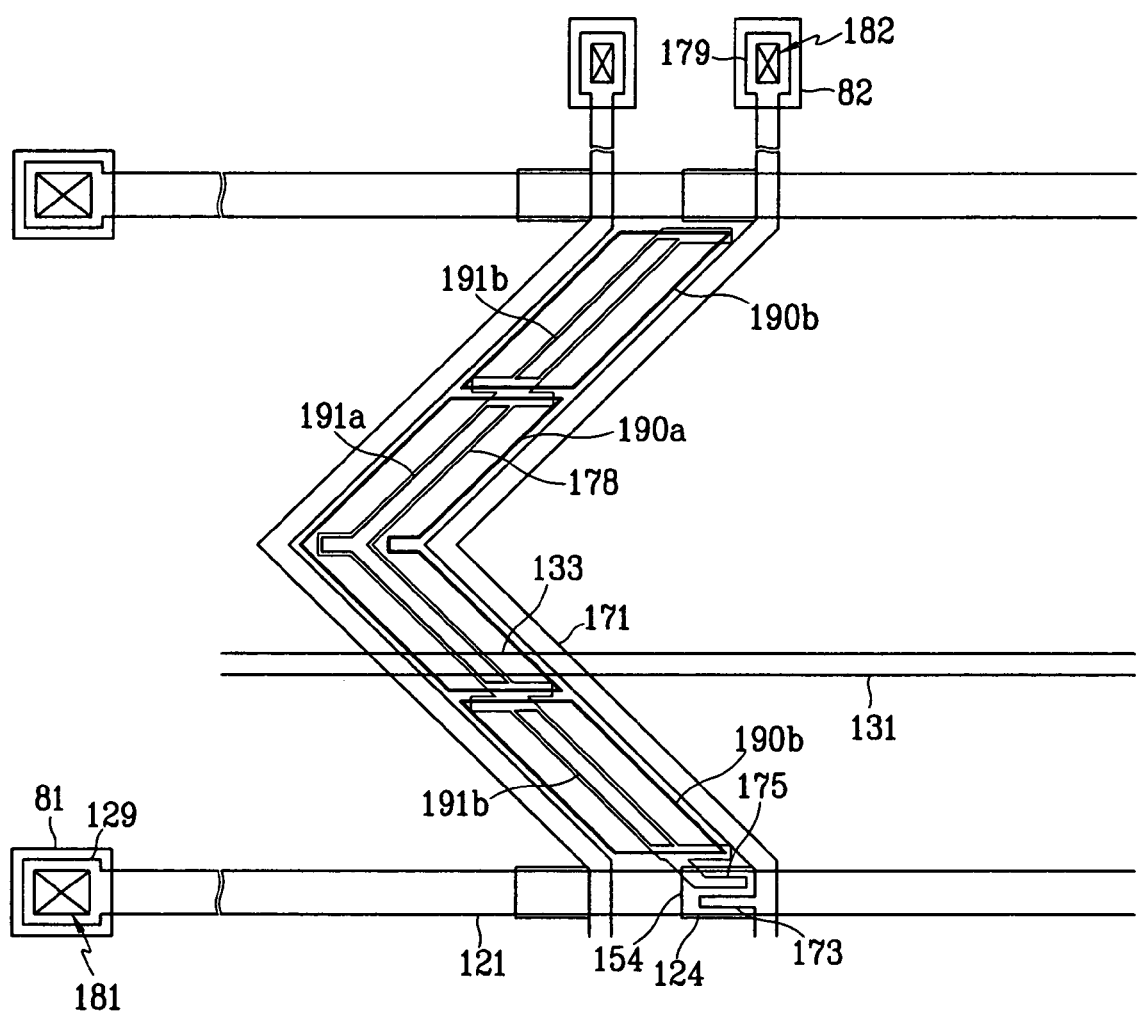
FIG. 9 is a layout view of an LCD according to the fifth embodiment of the present invention.

FIG. 9 is a layout view of an LCD according to the fifth embodiment of the present invention. FIG. 7 can be used as a circuit diagram of the LCD shown in FIG. 9. As shown in FIGS. 7 and 9, a plurality of pairs of pixel electrodes 190a and 190b and a plurality of contact assistants 81 and 82 are formed on the passivation layer 180.

The pixel electrode includes a first pixel electrode 190a and a second pixel electrode 190b. The first pixel electrode 190a has a shape of a bent band following the shape of the pixel area, and has a bent oblique line shaped first cutout 191a. The second pixel electrode 190b includes two separated parallelograms, and each parallelogram has an oblique line shaped second cutout 191b. The first pixel electrode 190b is disposed between the two parallelograms of the second pixel electrode 190b. The first pixel electrode 190b and the second pixel electrode 190b are substantially the same size. The first cutout 191a and the second cutout 191b respectively divide the first pixel electrode 190a and the second pixel electrode 190b. A direction control electrode 178 is disposed to overlap with the first and second cutouts 191a and 191b.

The voltages of the first and second pixel electrodes 190a and 190b may be adjusted by varying the size of an occupying area of the first and second pixel electrodes 190a and 190b. When a pixel area includes two sub-areas with somewhat different electric fields, lateral visibility is improved by the mutual compensation in the two sub-areas.

Sixth Embodiment

Figure 10:
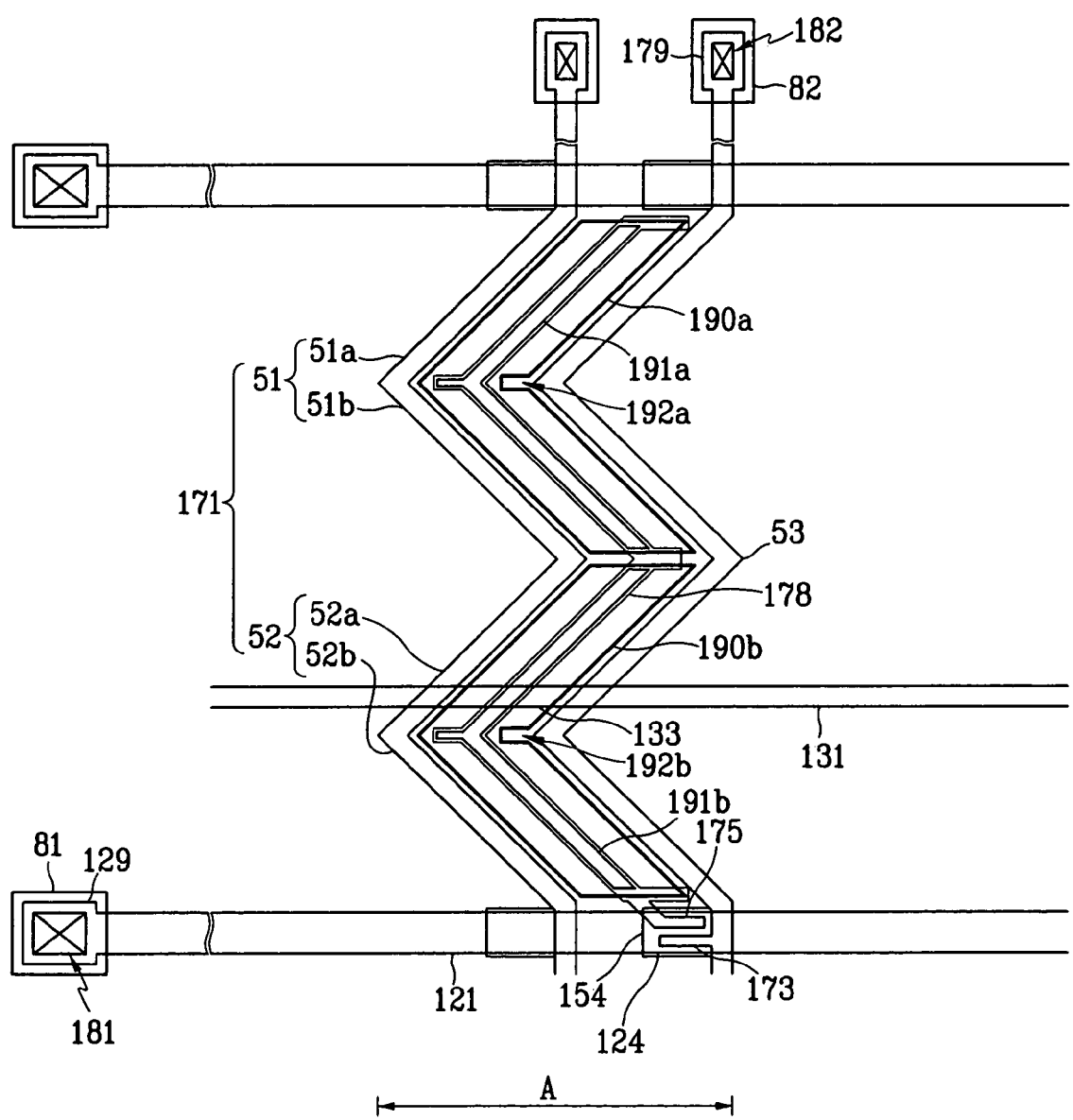
FIG. 10 is a layout view of an LCD according to the sixth embodiment of the present invention.

FIG. 10 is a layout view of an LCD according to the sixth embodiment of the present invention. FIG. 7 can be used as a circuit diagram of the LCD shown in FIG. 10. As shown in FIGS. 7 and 10, each data line 171 is bent repeatedly and includes a plurality of pairs of oblique portions 51a, 51b, 52a, and 52b, and a plurality of longitudinal portions. Two pairs of oblique portions 51a, 51b, 52a and 52b are connected to each other to form a double chevron 51 and 52. The first oblique portions 51a and 52a form an angle ranged between about 30° and about 60°, preferably 45°, with respect to the gate lines, and the second oblique portions 51b and 52b form an angle ranged between about 120° and about 150°, preferably 135°.

The double chevron 51 and 52 includes a first chevron 51 and a second chevron 52. The first chevron 51 and the second chevron 52 are connected to each other and have substantially the same shape. The branch extending form the data line 171 toward the drain electrode 175 forms a source electrode 173. The longitudinal portion of the data line 171 crosses a gate line 121. Therefore, a pixel area defined by the gate lines 121 and the data lines 171 has the shape of a triple vent band.

A first pixel electrode 190a and a second pixel electrode 190b are formed in each pixel area. The first and second pixel electrodes 190a and 190b have chevron shapes. The first pixel electrode 190a corresponds to the first chevron 51 of the data line 171, and has a first chevron cutout 191a dividing the first pixel electrode 190a into a right portion and a left portion. The second pixel electrode 190b corresponds to the second chevron 52 of the data line 171, and has a second chevron cutout 191b dividing the second pixel electrode 190b into a right portion and a left portion. The first pixel electrode 190a and the second pixel electrode 190b respectively have horizontal cutouts 192a and 192b which respectively divide the right portions of the first and second pixel electrodes 190a and 190b into a lower portion and an upper portion. The first and second chevron cutouts 191a and 191b include horizontal branches which respectively divide the left portions of the first and second pixel electrode 190a and 190b into a lower portion and an upper portion. A direction control electrode 178 overlaps the first and second chevron cutout 191a and 191b.

The voltage Vpa of the first pixel electrode 190a and the voltage Vpb of the second pixel electrode 190b can be adjusted to be different from each other by adjusting the size of an overlapping area or the distance between the direction control electrode 178 and the first and the second pixel electrodes 190a and 190b, or by adjusting the size of occupying areas of the first and second pixel electrode 190a and 190b in a pixel area.

When a pixel area includes two sub-areas with different electric fields, lateral visibility is improved by the mutual compensation in the two sub-areas. If a pixel area includes three or more pixel electrodes, a pixel area may includes three or more sub-areas with different electric fields to improve lateral visibility. The sixth embodiment shows a pixel shape of a triple vent band. Such a multi-vent band shape is helpful to reduce the horizontal width of a pixel area, which prevents a character from being seen as broken.

In the first to sixth embodiments, the LCDs did not have domain control members (e.g., protrusion, opening, aperture) formed in the common electrode. Thus, misalignment of the TFT panel and the common electrode panel is not a critical factor, which allows more design freedom. Also, the color filters have been assumed to be formed on the common electrode panel, but the color filters may be formed on the TFT array panel, for example, between the passivation layer and the pixel electrodes.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A liquid crystal display (LCD), comprising:
a first substrate;
a plurality of gate lines formed on the first substrate and extending in a first direction;
a plurality of data lines intersecting the gate lines, each data line having a bent shape, and a first portion extending in a second direction and a second portion extending in a third direction;
a plurality of pixel regions defined by intersecting of the gate lines and the data lines;

a plurality of direction control electrodes, each formed at the corresponding pixel region and switchably coupled to the corresponding data line; and a plurality of pixel electrodes, each formed at the corresponding pixel region and having a shape conformal to the corresponding pixel region, wherein the second direction and the third direction form an angle ranged between about 30° and about 60°.

2. The LCD of claim 1, wherein the pixel electrode is electrically disconnected from the data line.

3. The LCD of claim 1, wherein the second direction and the third direction form an angle of about 45°.

4. The LCD of claim 1, wherein the data line further comprises:

a third portion extending in a fourth direction; and a fourth portion extending in the fourth direction, wherein the fourth direction is substantially perpendicular to the first direction.

5. The LCD of claim 4, wherein the first portion and the second portion are arranged between two neighboring gate lines, and the third portion and the fourth portion intersect two neighboring gate lines, respectively.

6. The LCD of claim 1, wherein the direction control electrode comprises:

a first portion extending substantially parallel to the first portion of the data line; and a second portion extending substantially parallel to the second portion of the data line.

7. The LCD of claim 6, wherein the pixel electrode comprises a first cutout formed along the direction control electrode.

8. The LCD of claim 7, wherein the direction control electrode is wider than the first cutout.

9. The LCD of claim 7, wherein the pixel electrode further comprises a first portion and a second portion divided by the first cutout.

10. The LCD of claim 9, wherein the pixel electrode further comprises a connector coupled between the first portion and the second portion thereof.

11. The LCD of claim 9, wherein the first portion and the second portion are electrically isolated from each other.

12. The LCD of claim 9, wherein the pixel electrode further comprises a second cutout.

13. The LCD of claim 12, wherein the second cutout is formed near a portion where the first portion and the second portion of the direction control electrode are connected to each other.

14. The LCD of claim 1, further comprising:

a second substrate facing the first substrate;

a common electrode formed on the second substrate; and liquid crystal disposed in a gap between the first substrate and the second substrate.

15. The LCD of claim 1, further comprising a plurality of storage electrodes formed on the first substrate.

16. The LCD of claim 15, wherein each storage electrode is arranged between two neighboring gate lines and extending in the first direction.

17. The LCD of claim 1, wherein the pixel electrode comprises a first pixel electrode and a second pixel electrode, the first pixel electrode and the second pixel electrode having substantially the same shape.

18. The LCD of claim 17, wherein the first pixel electrode and the second pixel are electrically disconnected from each other.

19. The LCD of claim 17, wherein the pixel electrode is divided into the first pixel electrode and the second pixel electrode along an equidistance line between two neighboring data lines.

20. The LCD of claim 18, wherein each of the first pixel electrode and the second pixel electrode has a first cutout.

21. The LCD of claim 20, wherein the first cutout comprises:

a first portion extending substantially parallel to the first portion of the corresponding data line; and a second portion extending substantially parallel to the second portion of the corresponding data line.

22. The LCD of claim 21, wherein the direction control electrode comprises:

a first portion extending along the first cutout of the first pixel electrode; and a second portion extending along the first cutout of the second pixel electrode, wherein the first portion and the second portion of the direction control electrode are electrically connected to each other.

23. The LCD of claim 22, wherein the first portion and the second portion of the direction control electrode are wider than the first cutouts of the first pixel electrode and the second pixel electrode.

24. The LCD of claim 22, wherein each of the first pixel electrode and the second pixel electrode further comprises a second cutout formed near a portion where the first portion and the second portion of the first cutout are connected to each other.

25. The LCD of claim 19, further comprising a plurality of storage electrodes, each storage electrode comprising:

a main portion arranged between two neighboring gate lines and extending in a first direction; and a branch portion connected to the main portion and extending along the equidistance line between two neighboring data lines.

26. The LCD of claim 1, wherein the pixel electrode is divided into a plurality of portions comprising:

a first portion arranged adjacent to one of two neighboring gate lines;

a second portion arranged adjacent to the other of two neighboring gate lines; and a third portion arranged between the first portion and the second portion of the pixel electrode, wherein the first portion, the second portion and the third portion are electrically disconnected from each other.

27. The LCD of claim 26, wherein the direction control electrode comprises:

a first portion extending substantially parallel to the first portion of the data line; and a second portion extending substantially parallel to the second portion of the data line.

28. The LCD of claim 27, wherein each of the first portion, the second portion and the third portion of the pixel electrode has a first cutout formed along the direction control electrode.

29. The LCD of claim 28, wherein the third portion of the pixel electrode has a second cutout formed near a portion where the first portion and the second portion of the direction control electrode are connected to each other.

30. The LCD of claim 27, wherein the direction control electrode further comprises a plurality of third portions extending in the first direction and overlapping edges of the first portion, the second portion and the third portion of the pixel electrode.

31. The LCD of claim 1, wherein the data line comprises a plurality of oblique portions.

32. The LCD of claim 31, wherein the data line further comprises a plurality of longitudinal portions.

33. The LCD of claim 32, wherein the oblique portions are arranged between the gate lines.

34. The LCD of claim 33, wherein the longitudinal portions intersect the gate lines.

35. The LCD of claim 31, wherein the direction control electrode is formed along an equidistance line between two neighboring data lines.

36. The LCD of claim 31, wherein the pixel electrode comprises a plurality of portions electrically disconnected from each other.

37. The LCD of claim 35, wherein each portion of the pixel electrode has a first cutoff.

38. The LCD of claim 37, wherein the first cutoffs of the pixel electrode are formed along the direction control electrode.

39. The LCD of claim 37, wherein the direction control electrode is wider than the first cutoffs of the pixel electrode.

40. The LCD of claim 38, wherein the pixel electrode further comprises a second cutoff.

41. The LCD of claim 16, further comprising a passivation layer formed between the direction control electrode and the pixel electrode.

42. The LCD of claim 40, wherein the LCD satisfies the following equation:

$$Vdce > Vp(1+\epsilon d'/\epsilon' d),$$

where Vdce is a voltage of the direction control electrode, Vp is a voltage of the pixel electrode, $\epsilon$ is a dielectric constant of the liquid crystal, d is a distance between the pixel electrode and the common electrode, $\epsilon'$ is a dielectric constant of the passivation layer, and d' is a distance between the pixel electrode and the direction control electrode.

* * * * *